3,085,091
NOVEL PROCESS FOR ELIMINATION OF 4-HYDROXYL GROUP OF MORPHINAN DERIVATIVES
Yoshiro Sawa, Ashiya-shi, Shin Maeda, Amagasaki-shi, and Naoki Tsuji, Semboku-gun, Japan, assignors to Shionogi & Co., Ltd., Osaka, Japan
No Drawing. Filed Dec. 19, 1960, Ser. No. 76,511
Claims priority, application Japan Dec. 29, 1959
19 Claims. (Cl. 260—285)

This invention relates to a novel process for eliminating a hydroxyl group of morphinan derivatives, especially to a novel process for selectively eliminating a 4-positioned hydroxyl group of the morphinan skeleton.

The fundamental object of the present invention is to provide a novel useful process for preparation of many valuable drugs as central nervous depressants, namely sedatives, antitussives, analgesics, or the like.

Another object of the present invention is to provide novel compounds having excellent therapeutical properties as central nervous depressants or enormous utility for the preparation of excellent drugs as intermediates.

Recently, a vast amount of work has been done in order to obtain drugs with as powerful sedative and analgesic action as that of morphine, but without its habit-forming attributes. And, already, innumerable effective compounds having a structure closely related to that of morphine and the desired attributes of a non habit-forming and a non depressive analgesic have been synthesized, and many of which, it is noted, have no substituents at 4-position of morphinan skeleton.

Accordingly, it is necessary to eliminate selectively 4-hydroxyl group for the preparation of such morphinan analogs from natural morphine alkaloids having hydroxyl groups or the related substituents at 3- and 4-positions, of which usefulnesses are diminished because of their unfavorable habit-forming properties.

The process of the present invention assumes significant importance to meet the above requirements. For instance, thebaine which has not been utilized well in spite of its abundant sources and cheap cost, can be important raw material for the present invention to synthesize useful medicines described above.

The present invention may be represented by the following general reaction scheme:

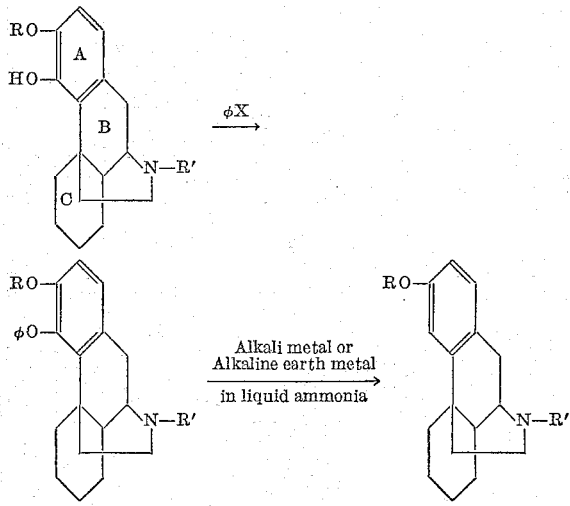

wherein R represents a lower alkyl group, R' represents a hydrogen, an alkyl, an aryl alkyl, an acyl, or a cyano group, φ represents a substituted or unsubstituted aryl group involving a heterocyclic ring such as pyridyl or quinolyl, and X represents halogen.

In the above formula, the C-ring of the morphinan skeleton may be unsaturated and may involve one or more substituents, such as oxo-, hydroxyl-, alkoxy- or alkyl group. Moreover, steric isomer of normal morphinan, such as isomorphinan, may be also represented by the present formula. And optical isomers are of course equally involved.

As identified in the above general scheme, the starting materials of the present invention are 3-alkoxy-4-hydroxymorphinan derivatives.

Firstly, these compounds are treated with aryl halide to produce 3-alkoxy-4-aryloxymorphinan (II). The reaction is carried out by heating the mixture of the starting material and aryl halide in basic solvent. Addition of a suitable catalyst, such as copper powder may promote the reaction in usual cases. As the basic solvent, pyridine or the related bases, or solvents containing inorganic base are usable. Especially pyridine containing alkali carbonate is the most preferred of all.

On the other hand, as aryl halide, phenyl halide, methylphenyl halide, methoxy-phenyl halide, naphthyl halide, pyridyl halide, quinolyl halide or the like may be exemplified. With respect to the halogen, chloride, bromide, and iodide can be equally used.

Thus produced 3-methoxy-4-aryloxymorphinan derivatives (II) are reduced to eliminate the aryloxy-group of the 4-position in the next step.

This reduction is executed by treating the 3-alkoxy-4-aryloxymorphinan with alkali metal or alkaline earth metal, such as lithium, sodium, or calcium, in liquid ammonia at about —50° C. Alternatively, suitable non polar solvent, such as ether, dioxane, tetrahydrofuran or toluene, may be supplied at need.

This reduction is distinguished by its selectivity. In other words, the reduction does not effect other substituents or unsaturated bond, but only the aryloxy-group of the 4-position. For example, 3,6-dimethoxy-4-phenoxy-N-methyl-5-dehydromorphinan is transformed to 3,6-dimethoxy-N-methyl-5-dehydromorphinan by this reduction without any reduction except for reductive elimination of the 4-phenoxy group.

Although the present invention consists of the above described two processes substantially, some treatments aiming to protect or eliminate the substituents of C-ring may be inserted between these two substantial processes. For this purpose, very popularized or commonly used reactions such as Clemmensen reduction, catalytic reduction, ketalisation or the like are employed as occasion demands.

The present invention has enormous utility in the preparation of many central nervous depressants, especially sedatives and analgesics, from morphine alkaloids or the related compounds. The pharmacological activities of the novel compounds obtained in the process of the present invention or transformed from them are listed in the following table.

| Compounds | Analgesic activity [1] | Antitussive activity [2] |
|---|---|---|
| L-3-methoxy-6-oxo-N-methylmorphinan | 2.7 | 1.0 |
| L-3-methoxy-6-oxo-N-methyl-7-dehydromorphinan | 2.1 | 4.9 |
| D-3-hydroxy-N-methylisomorphinan | 3-4 | |
| L-3-methoxy-6-oxo-14-hydroxy-N-methylmorphinan | 6 | 16 |
| D-3-methoxy-6α-hydroxy-N-methylmorphinan | 0.17 | 2 |
| D-3-methoxy-6α-acetoxy-N-methylmorphinan | 1.6 | 5 |
| D-3-hydroxy-6-oxo-N-methylmorphinan | 1.8 | 2.9 |

[1] The number is shown as the effective ratio to morphine, and its value is expressed as 1.
[2] The number is shown as the effective ratio to codeine, and its value is expressed as 1.

The compounds listed in the above table are shown only as examples, and all compounds obtained by the present novel process are usable as intermediates for many drugs as well as medicines themselves.

The following examples will illustrate the synthesizing procedure in further details, but they are presented by way of illustration only and not as indicating the scope of the invention.

EXAMPLE I

Part 1

L - 3,6 - dimethoxy - 4 - hydroxy - N - methyl - 5,8-didehydromorphinan (47.01 g.) (which is usually called dihydrothebaine-$\phi$ and prepared from thebaine by the method of O. Schnider: J. Org. Chem., 1952, 958) was dissolved in pyridine (240 cc.). To the solution potassium carbonate (31.10 g.), copper powder (4.7 g.) and bromobenzene (47.1 g.) were added and the mixture was refluxed for 15 hrs. at 150–155° C. (bath-temperature) under stirring. After the reaction, inorganic substances were removed by filtration, and the solvent was distilled off under reduced pressure. After the addition of a small quantity of water to the residue, the mixture was distilled again to remove volatile substances. Then, the residue was extracted with benzene, and purified by chromatography on alumina. Recrystallizing from 2-propanol, 36.12 g. of L-3,6-dimethoxy-4-phenoxy-N-methyl-5,8-didehydromorphinan was obtained, M.P. 137° C. (61.8%).

Analysis.—Calcd. for $C_{25}H_{27}O_3N$: C, 77.09; H, 6.99; N, 3.60. Found: C, 77.17; H, 7.10; N, 3.66.

$[\alpha]_D^{30}$ +34.1° (0.973% in EtOH).

Picrate: M.P. 187–188° C. (decomp.).

Analysis.—Calcd. for $C_{25}H_{27}O_3N \cdot C_6H_3O_7N_3$: C, 60.18; H, 4.89; N, 9.06. Found: C, 60.05; H, 5.40; N, 9.00.

Part 2

A bit of sodium was added to liquid ammonia (600 cc.) and cooled to −50 to −60° C. To the solution the mixture of L-3,6-dimethoxy-4-phenoxy-N-methyl-5,8-didehydromorphinan (15 g.) and anhydrous toluene (150 cc.) was added dropwise slowly. During the dropwise addition, sodium was supplied in close succession. The addition took about 50 mins. In the presence of excess of sodium, the mixture was stirred for 1 hr., and then the remaining sodium was decomposed by the addition of ammonium chloride. Evaporating ammonia, the residue was extracted with toluene after addition of a little water, and the extracts were washed with 1 N NaOH. Removing the solvent, the residue was purified by chromatography on alumina. Recrystallizing from petroleum ether, 10.31 g. of L-3,6-dimethoxy-N-methyl-5,8-didehydromorphinan was obtained, M.P. 85–87° C. (90%).

Analysis.—Calcd. for $C_{19}H_{23}O_2N$: C, 76.73; H, 7.80; N, 4.70. Found: C, 76.99; H, 7.75; N, 4.66.

$[\alpha]_D^{25}$ −24.9° (2% in EtOH).

EXAMPLE II

A bit of lithium was added to liquid ammonia (100 cc.) and cooled to −50 to −55° C. To the solution the mixture of L-3,6-dimethoxy-4-phenoxy-N-methyl-5,8-didehydromorphinan (2.0 g.) obtained in Part 1 of Example I and anhydrous toluene (20 cc.) was added dropwise slowly. During the dropwise addition, lithium was supplied in close succession. The addition took about 20 mins. In the presence of excess of lithium, the mixture was stirred for 1 hr. The remaining lithium was decomposed by the addition of ammonium chloride. Lithium consumption was 0.25 g. Evaporating ammonia, the residue was extracted with benzene after addition of a little water. The benzene solution was purified by chromatography on alumina. Recrystallizing from petroleum ether, 1.23 g. of L - 3,6 -dimethoxy - N - methyl - 5,8 -didehydromorphinan was obtained, M.P. 86–87° C., which was identified with the product of Example I.

EXAMPLE III

A bit of calcium was added to liquid ammonia (100 cc.) and cooled to −55° C. To the solution the mixture of L - 3,6 - dimethoxy - 4 - phenoxy - N - methyl - 5,8-didehydromorphinan (2.0 g.) obtained in Part 1 of Example I and anhydrous toluene (20 cc.) was added dropwise slowly. During the dropwise addition, calcium was supplied in close succession. In the presence of excess of calcium, the mixture was stirred for 1 hr., and the remaining calcium was decomposed by addition of ammonium chloride. Evaporating ammonia, the residue was extracted with benzene after addition of a little water. Recrystallizing from petroleum ether, 1.23 g. of L-3,6-dimethoxy - N - methyl - 5,8 - didehydromorphinan was obtained, M.P. 86–87° C., which was identified with the product of Example I.

EXAMPLE IV

Part 1

A mixture of L-3,6-dimethoxy-4-phenoxy-N-methyl-5,8 - didehydromorphinan (12.52 g.), 4 - nitro - 1-bromobenzene (8.88 g.), potassium carbonate (6.0 g.), copper powder (1.3 g.) and pyridine (40 cc.) was refluxed for 10 hrs. at 150° C. Working up in the similar manner with Example I, 9.9 g. of L-3,6-dimethoxy-4-(4 - nitrophenoxy) - N - methyl - 5,8 - didehydromorphinan was obtained, M.P. 97–108° C. (recrystallized from ether).

$[\alpha]_D^{20}$ −17.7° (0.990% in EtOH).

Analysis.—Calcd. for $C_{25}H_{26}O_5N_2 \cdot \frac{1}{2}C_2H_5OC_2H_5$: C, 68.77; H, 6.33; N, 5.94. Found: C, 68.68; H, 6.58; N, 5.92.

Part 2

L - 3,6 -dimethoxy - 4 - (4 - nitrophenoxy - N - methyl-5,8-didehydromorphinan (1.50 g.) was dissolved in anhydrous toluene (15 cc.), and reduced in liquid ammonia (80 cc.) containing sodium at −55 to −60° C. Working up in the similar manner with Example I, 0.177 g. of L - 3,6 - dimethoxy - N - methyl - 5,8 -didehydromorphinan was obtained, which was identified with the product of Example I.

EXAMPLE V

Part 1

A mixture of L-3,6-dimethoxy-4-hydroxy-N-methyl-5,8-didehydromorphinan (12.55 g.), 4-bromotoluene (7.53 g.), potassium carbonate (6.2 g.), copper powder (1.3 g.) and pyridine (40 cc.) was refluxed for 15 hrs. at 150° C. Working up in the similar manner with Example I, 8.47 g. of L-3,6-dimethoxy-4-(4-methylphenoxy)-N-methyl-5,8-didehydromorphinan was obtained, M.P. 159–160° C. (recrystallized from 99% ethanol).

$[\alpha]_D^{28}$ +36.4° (1.094% in EtOH).

Analysis.—Calcd. for $C_{26}H_{29}O_3N$: C, 77.39; H, 7.24; N, 3.47. Found: C, 77.38; H, 7.30; N, 3.40.

Part 2

L-3,6-dimethoxy - 4 - (4 - methylphenoxy)-N-methyl-5,8-didehydromorphinan (1.00 g.) was dissolved in anhydrous toluene (20 cc.) and reduced in liquid ammonia containing sodium at −50 to −55° C. Working up in the similar manner with Example I, 0.75 g. of L-3,6-dimethoxy-N-methyl-5,8-didehydromorphinan was obtained, which was identified with the product of Example I.

EXAMPLE VI

Part 1

A mixture of L-3,6-dimethoxy-4-hydroxy-N-methyl-5,8-didehydromorphinan (12.52 g.), 4-bromoanisole (8.32 g.), potassium carbonate (6.2 g.), copper powder (1.3 g.) and pyridine (40 cc.) was refluxed for 15 hrs. at 150° C. Working up in the similar manner with Example I, 6.18 g. of L-3,6-dimethoxy-4-(4-methoxyphenoxy)-N-methyl-5,8-didehydromorphinan was obtained, M.P. 128–129° C. (recrystallized from ether).
$[\alpha]_D^{28}$ +27.1° (1.019% in EtOH).
*Analysis.*—Calcd. for $C_{26}H_{29}O_4N$: C, 74.44; H, 6.97; N, 3.34. Found: C, 74.32; H, 7.09; N, 3.33.

Part 2

L-3,6-dimethoxy - 4 - (4 - methoxyphenoxy)-N-methyl-5,8-didehydromorphinan (0.954 g.) was dissolved in anhydrous toluene (17 cc.) and reduced in liquid ammonia (80 cc.) containing sodium at −55 to −60° C. Working up in the similar manner with Example I, 0.72 g. of L-3,6-dimethoxy-N-methyl-5,8-didehydromorphinan was obtained, which was identified with the product of Example I.

EXAMPLE VII

Part 1

A mixture of L-3,6-dimethoxy-4-hydroxy-N-methyl-5,8-didehydromorphinan (12.52 g.), 2-bromonaphthalene (9.1 g.), potassium carbonate (6.2 g.), copper powder (1.3 g.) and pyridine (40 cc.) was refluxed for 15 hrs. at 150° C. Working up in the similar manner with Example I, 9.64 g. of L-3,6-dimethoxy-4-(2-naphthyloxy)-N-methyl-5,8-didehydromorphinan was obtained, M.P. 204–205.5° C. (recrystallized from ethyl acetate).
$[\alpha]_D^{29}$ +28.0° (1.05% in chloroform).
*Analysis.*—Calcd. for $C_{29}H_{29}O_3N$: C, 79.24; H, 6.65; N, 3.19. Found: C, 79.03; H, 6.72; N, 3.35.

Part 2

L-3,6-dimethoxy - 4 - (2 - naphthyloxy)-N-methyl-5,8-didehydromorphinan (1.00 g.) was dissolved in anhydrous toluene (30 cc.) and reduced in liquid ammonia (100 cc.) containing sodium at −55 to −60° C. Working up in the similar manner with Example I, 0.48 g. of L-3,6-dimethoxy-N-methyl-5,8-didehydromorphinan was obtained, which was identified with the product of Example I.

EXAMPLE VIII

Part 1

A mixture of L-3,6-dimethoxy-4-hydroxy-N-methyl-5,8-didehydromorphinan (12.52 g.), 2-bromopyridine (7.0 g.), potassium carbonate (6.2 g.), copper powder (1.3 g.) and pyridine (40 cc.) was refluxed for 15 hrs. at 150° C. Working up in the similar manner with Example I, 6.63 g. of L-3,6-dimethoxy-4-(2-pyridyloxy)-N-methyl-5,8-didehydromorphinan was obtained, M.P. 153–154° C. (recrystallized from ethyl acetate).
$[\alpha]_D^{24}$ +14.7° (1.066% in EtOH).
*Analysis.*—Calcd. for $C_{24}H_{26}O_3N_2$: C, 73.82; H, 6.71; N, 7.18. Found: C, 73.53; H, 6.89; N, 7.17.

Part 2

L-3,6-dimethoxy-4-(2-pyridyloxy) - N - methyl-5,8-didehydromorphinan (1.00 g.) was dissolved in anhydrous toluene (15 cc.) and reduced in liquid ammonia (70 cc.) at −50 to −55° C. Working up in the similar manner with Example I, 0.58 g. of L-3,6-dimethoxy-N-methyl-5,8-didehydromorphinan was obtained, which was identified with the product of Example I.

EXAMPLE IX

Part 1

A mixture of L-3,6-dimethoxy-4-hydroxy-N-methyl-5,8-didehydromorphinan (12.52 g.), 4-bromoquinoline (9.16 g.), potassium carbonate (6.2 g.), copper powder (1.3 g.) and pyridine (40 cc.) was refluxed for 15 hrs. Working up in the similar manner with Example I, 5.6 g. of L-3,6-dimethoxy - 4 - (4 - quinolyloxy)-N-methyl-5,8-didehydromorphinan was obtained; dimethiodide, M.P. 226–227° C. (decomp.) recrystallized from ethanol).
$[\alpha]_D^{30}$ −12.5° (0.624% in $H_2O$).
*Analysis.*—Calcd. for $C_{30}H_{34}O_3N_2I_2$: C, 49.74; H, 4.73; N, 3.78; I, 35.04. Found: C, 49.87; H, 4.92; N, 3.88; I, 35.51.

Part 2

L-3,6-dimethoxy - 4 - (4 - quinolyloxy)-N-methyl-5,8-didehydromorphinan was dissolved in anhydrous toluene (30 cc.) and reduced in liquid ammonia (100 cc.) containing sodium at −55 to −60° C. Working up in the similar manner with Example I, 0.51 g. of L-3,6-dimethoxy-N-methyl-5,8-didehydromorphinan was obtained, which was identified with the product of Example I.

EXAMPLE X

Part 1

A mixture of L-3-methoxy-4-hydroxy-6-oxo-N-methylmorphinan (dihydrothebainone) (1.5 g.), potassium carbonate (1.5 g.), copper powder (0.15 g.), bromobenzene (1.58 g.) and pyridine (30 cc.) was refluxed for 16 hrs. at 115–120° C. Working up in the similar manner with Example I, 0.50 g. of L-3-methoxy-4-phenoxy-6-oxo-N-methylmorphinan was obtained, M.P. 145–146° C. (recrystallized from ether).
$[\alpha]_D^{29}$ +11.2° (1% in EtOH).
*Analysis.*—Calcd. for $C_{24}H_{27}O_3N \cdot H_2O$: C, 72.88; H, 7.39; N, 3.45; $H_2O$, 4.55. Found: C, 73.08; H, 7.41; N, 3.87; $H_2O$, 3.92.

Part 2

L-3-methoxy - 4 - phenoxy-6-oxo-N-methyl-morphinan (10 g.) was dissolved in anhydrous toluene (100 cc.) and reduced in liquid ammonia (400 cc.) containing sodium at −50 to −60° C. Working up in the similar manner with Example I, 3.5 g. of L-3-methoxy-6-oxo-N-methylmorphinan was obtained, M.P. 187–189° C. (recrystallized from 99% ethanol).
$[\alpha]_D^{22}$ −96.5° (2% in EtOH).
*Analysis.*—Calcd. for $C_{18}H_{23}O_2N$: C, 75.75; H, 8.12; N, 4.91. Found: C, 75.88; H, 8.17; N, 4.89.

When L - 3 - methoxy - 4 - hydroxy-6-ethylenedioxy-N-methylmorphinan (6 - ethyleneketal compound) was treated in the same manner as the above and hydrolized, L - 3 - methoxy-6-oxo-N-methylmorphinan was obtained also.

EXAMPLE XI

Part 1

A mixture of L-3,6-dimethoxy-4-hydroxy-N-methyl-5-dehydromorphinan (dihydrothebainone enol methyl ether) (1.0 g.), bromobenzene (1.0 g.), potassium carbonate (1.0 g.), copper powder (1.0 g.) and pyridine (40 cc.) was refluxed for 15 hrs. at 115–120° C. Working up in the similar manner with Example I, 0.309 g. of L - 3,6-dimethoxy-4-phenoxy-N-methyl-5-dehydromorphinan was obtained, M.P. 106–107° C. (recrystallized from petroleum ether).
$[\alpha]_D^{32}$ −55.4° (2.069% in EtOH).
*Analysis.*—Calcd. for $C_{25}H_{29}O_3N$: C, 76.69; H, 7.47; N, 3.58. Found: C, 76.49; H, 7.47; N, 3.46.

Part 2

L - 3,6 - dimethoxy-4-phenoxy-N-methyl-5-dehydromorphinan (1.0 g.) was reduced in liquid ammonia (400 cc.) containing sodium at −50 to −60° C. Working up in the similar manner with Example I, 0.699 g. of L-3,6-dimethoxy-N-methyl-5-dehydromorphinan was obtained, M.P. 103.5–104.5° C. (recrystallized from petroleum ether).
$[\alpha]_D^{30}$ −70.5° (1.039% in EtOH).
*Analysis.*—Calcd. for $C_{19}H_{23}O_2N$: C, 76.22; H, 8.42; N, 4.68. Found: C, 76.44; H, 8.51; N, 4.48.

EXAMPLE XII

Part 1

L-3,6 - dimethoxy - 4-phenoxy-N-methyl-5,8-didehydromorphinan (3.0 g.) (prepared in Part 1 of Example I)

was added to conc. hydrochloric acid (25 cc.) and stirred vigorously on a steam bath. To the mixture a half portion of amalgamated zinc prepared from zinc (20 g.) was added portionwise in 1 hr. After supplement of conc. hydrochloric acid (5 cc.), the mixture was stirred for 1 hr. Then another half of amalgamated zinc was added in 1 hr. and the mixture was stirred for further 3 hrs. under the successive 5-times supplement of 5 cc. of conc. hydrochloric acid each time. After cooling, the reaction mixture was made alkaline with sodium hydroxide, and extracted with benzene. The crude product was purified by chromatography on alumina to give 1.24 g. of L-3-methoxy-4-phenoxy-N-methyl-morphinan, M.P. 92–93° C.

$[\alpha]_D^{25}$ —6.7° (2% in EtOH).

*Analysis.*—Calcd. for $C_{24}H_{29}O_2N$: C, 79.30; H, 8.04; N, 3.85. Found: C, 79.13; H, 8.06; N, 3.54.

Part 2

L-3-methoxy-4-phenoxy-N-methylmorphinan (2.34 g.) was dissolved in anhydrous ether (10 cc.) and reduced in liquid ammonia (100 cc.) at —55 to —60° C. Working up in the similar manner with Example I, 1.702 g. of L-3-methoxy-N-methylmorphinan was obtained, M.P. 106–108° C.

$[\alpha]_D^{30}$ —45.9° (2% in EtOH).

This compound was identified with an authentic sample of levomethorphan.

EXAMPLE XIII

Part 1

A mixture of D-3,7-dimethoxy-4-hydroxy-6-oxo-N-methyl-7-dehydromorphinan (sinomenine) (16.47 g.), bromobenzene (8.64 g.), potassium carbonate (8.24 g.), copper powder (1.65 g.) and pyridine (50 cc.) was refluxed for 15 hrs. Working up in the similar manner with Example I, 10.3 g. of D-3,7-dimethoxy-4-phenoxy-6-oxo-N-methyl-7-dehydromorphinan was obtained. Recrystallizing from pyridine, the pyridine adduct was obtained, M.P. 120–123° C.

$[\alpha]_D^{19}$ —116.4° (0.975% in EtOH).

*Analysis.*—Calcd. for $C_{25}H_{27}O_4N.C_5H_5N$: C, 74.35; H, 6.66; N, 5.78. Found: C, 74.51; H, 6.67; N, 5.78.

Part 2

D-3,7-dimethoxy-4-phenoxy-6-oxo-N-methyl-7-dehydro-morphinan (2 g.) was dissolved in anhydrous toluene (70 cc.) and reduced in liquid ammonia (150 cc.) containing sodium at —50 to 55° C. Working up in the similar manner with Example I, 0.42 g. of D-3,7-dimethoxy-6-oxo-N-methyl-7-dehydromorphinan and 0.7 g. of D-3,7-dimethoxy-6-oxo-N-methyl-morphinan was obtained. The former is insoluble in ether and the latter is easily soluble in ether.

D-3,7-dimethoxy-6-oxo-N-methyl-7-dehydromorphinan, M.P. 180–182° C. (recrystallized from ether).

$[\alpha]_D^{20}$ —24.2° (1.056% in EtOH).

*Analysis.*—Calcd. for $C_{19}H_{23}O_3N$: C, 72.82; H, 7.40; N, 4.47. Found: C, 72.75; H, 7.60; N, 4.61.

D-3,7-dimethoxy-6-oxo-N-methyl-morphinan methiodide, M.P. 222–225° C.

*Analysis.*—Calcd. for $C_{20}H_{28}O_3NI.C_2H_5OH$: C, 52.49; H, 6.81; N, 2.78. Found: C, 52.55; H, 6.53; N, 2.96.

EXAMPLE XIV

D-3-methoxy-4-phenoxy-6,6,7,7-bisethylenedioxy-N-methyl-morphinan (prepared by ketalization of D-3-methoxy-4-phenoxy-6-oxo-7-hydroxy-N-methyl-7-dehydromorphinan produced by hydrolysis of D-3,7-dimethoxy-4-phenoxy-6-oxo-N-methyl-7-dehydromorphinan obtained in Part 1 of Example XIII) (3.0 g.) was dissolved in anhydrous toluene (110 cc.) and reduced in liquid ammonia (300 cc.) containing sodium at —50 to —55° C. Working up in the similar manner with Example I, 2.35 g. of D-3-methoxy-6,6,7,7-bisethylenedioxy-N-methylmorphinan was obtained, M.P. 203–206° C. (recrystallized from methanol).

$[\alpha]_D^{23}$ +49.8° (1.088% in EtOH).

*Analysis.*—Calcd. for $C_{22}H_{29}O_5N$: C, 68.19; H, 7.54; N, 3.62. Found: C, 68.46; H, 7.46; N, 3.57.

EXAMPLE XV

D-3,7-dimethoxy-4-phenoxy-6,6-ethylenedioxy-N-methylmorphinan (1.0 g.) (prepared by catalytic reduction of D-3,7-dimethoxy-4-phenoxy-6,6-ethylenedioxy-N-methyl-7-dehydromorphinan produced by ketalization of D-3,7-dimethoxy-4-phenoxy-6-oxo-N-methyl-7-dehydromorphinan obtained in Part 1 of Example XIII) (1.0 g.) was dissolved in anhydrous toluene (20 cc.) and reduced in liquid ammonia (100 cc.) containing sodium at —55 to —60° C. Working up in the similar manner with Example I, 0.71 g. of D-3,7-dimethoxy-6,6-ethylenedioxy-N-methylmorphinan was obtained, M.P. 182–183° C.

$[\alpha]_D^{24}$ +10.0° (1.001% in EtOH).

*Analysis.*—Calcd. for $C_{21}H_{29}O_4N$: C, 70.17; H, 8.13; N, 3.90. Found: C, 70.33; H, 8.37; N, 3.89.

EXAMPLE XVI

D-3,7-dimethoxy-4-phenoxy-6-oxo-N-methylmorphinan (0.2 g.) (prepared by catalytic reduction of D-3,7-dimethoxy-4-phenoxy-6-oxo-N-methyl-7-dehydromorphinan obtained in Part 1 of Example XIII) was dissolved in anhydrous toluene (40 cc.) and reduced in liquid ammonia (200 cc.) containing sodium. Working up in the similar manner with Example I, 1.45 g. of D-3,7-dimethoxy-6-oxo-N-methylmorphinan was obtained as sirupy substance. Methiodide, M.P. 222–225° C.

*Analysis.*—Calcd. for $C_{20}H_{28}O_3NI.C_2H_5OH$: C, 52.49; H, 6.81; N, 2.78. Found: C, 52.55; H, 6.53; N, 2.96.

EXAMPLE XVII

Part 1

A mixture of D-3-methoxy-4-hydroxy-N-methylmorphinan (5.74 g.) bromobenzene (6.28 g.), potassium carbonate (3.14 g.), copper powder (1.0 g.) and pyridine (40 cc.) was refluxed for 15 hrs. Working up in the similar manner with Example I, 3.76 g. of D-3-methoxy-4-phenoxy-N-methylmorphinan was obtained, M.P. 94° C. Picrate, M.P. 215–216° C.

*Analysis.*—Calcd. for $C_{24}H_{29}O_2N.C_6H_3O_7N_3$: C, 60.80; H, 5.44; N, 9.46. Found: C, 60.57; H, 5.49; N, 9.30.

Part 2

D-3-methoxy-4-phenoxy-n-methylmorphinan (0.97 g.) was dissolved in anhydrous ether (50 cc.) and reduced in liquid ammonia (500 cc.) containing sodium at —55 to —60° C. Working up in the similar manner with Example I, 0.688 g. of D-3-methoxy-N-methylmorphinan was obtained, M.P. 109–111° C. (recrystallized from ether).

$[\alpha]_D^{30}$ +48.1° (0.915% in EtOH).

*Analysis.*—Calcd. for $C_{18}H_{25}ON$: C, 79.66; H, 9.29; N, 5.16. Found: C, 79.80; H, 9.28; N, 4.90.

This compound was identified with an authentic sample of dextromethorphan.

EXAMPLE XVIII

Part 1

A mixture of L-3-methoxy-4,14-dihydroxy-6-oxo-N-methylmorphinan (6.35 g.), bromobenzene (3.5 g.), potassium carbonate (3.5 g.), copper powder (0.7 g.) and pyridine (20 cc.) was refluxed for 13 hrs. Working up in the similar manner with Example I, 6.8 g. of L-3-methoxy-4-phenoxy-6-oxo-14-hydroxy-N-methylmorphinan was obtained, M.P. 121–122° C. (recrystallized from ether).

$[\alpha]_D^{22}$ +15.1° (1% in EtOH).

*Analysis.*—Calcd. for $C_{24}H_{26}O_4N$: C, 73.26; H, 6.92; N, 3.56. Found: C, 73.43; H, 7.11; N, 3.47.

Part 2

L - 3 - methoxy - 4 - phenoxy - 6,6 - ethylenedioxy - 14-hydroxy-N-methylmorphinan (2.5 g.) was dissolved in anhydrous ether (60 cc.) and reduced in liquid ammonia (150 cc.) containing sodium. Working up in the similar manner with Example I, 1.7 g. of L-3-methoxy-6, 6-ethylenedioxy-14-hydroxy-N-methylmorphinan was obtained, M.P. 168–169° C. (recrystallized from ether), which was treated with 2 N hydrochloric acid to afford L-3-methoxy-6-oxo-14-hydroxy-N-methylmorphinan, M.P. 192–194° C. (recrystallized from ethanol).

$[\alpha]_D^{24}$ —117.6° (1% in chloroform).

Analysis.—Calcd. for $C_{18}H_{22}O_3N$: C, 71.73; H, 7.69; N, 4.65. Found: C, 71.52; H, 7.79; N, 4.50.

EXAMPLE XIX

Part 1

A mixture of L-3-methoxy-4-hydroxy-N-methylisomorphinan (4.44 g.) bromobenzene (3.06 g.), potassium carbonate (2.49 g.), copper powder (0.44 g.) and pyridine (40 cc.) was refluxed for 15 hrs. at 145–150° C. Working up in the similar manner with Example I, 1.59 g. of L-3-methoxy-4-phenoxy-N-methylisomorphinan was obtained as pale yellow oily substance.

Part 2

L-3-methoxy-4-phenoxy-N-methylisomorphinan (0.8 g.) was dissolved in anhydrous ether, and reduced in liquid ammonia (80 cc.) containing sodium at —64° C. Working up in the similar manner with Example I, 0.449 g. of L-3-methoxy-N-methylisomorphinan was obtained as colorless oily substance.

$[\alpha]_D^{26}$ —91.1° (1% in chloroform).

Picrate, M.P. 207–208° C. (recrystallized from ethanol).

$[\alpha]_D^{24}$ —29.4° (1% in acetone).

Analysis.—Calcd. for $C_{18}H_{25}ON.C_6H_3O_7N_3$: C, 57.59; H, 5.64; N, 11.20. Found: C, 57.78; H, 5.89; N, 11.12.

EXAMPLE XX

Part 1

A mixture of L-3-methoxy-4-hydroxy-6-oxo-N-methylisomorphinan (3.01 g.) bromobenzene (3.40 g.), potassium carbonate (2.07 g.), copper powder (0.30 g.) and pyridine (60 cc.) was refluxed for 10 hrs. at 145–150° C. Working up in the similar manner with Example I, L-3-methoxy - 4 - phenoxy - 6 - oxo - N - methylisomorphinan (1.97 g.) was obtained, M.P. 155–156° C. (recrystallized from ethanol).

$[\alpha]_D^{31}$ —41.0° (1.097% in chloroform).

Analysis.—Calcd. for $C_{24}H_{27}O_3N$: C, 76.36; H, 7.21; N, 3.71. Found: C, 76.30; H, 7.28; N, 3.75.

Ketalisation of the product according to the usual method, gave L-3-methoxy-4-phenoxy-6, 6-ethylenedioxy-N-methylisomorphinan as oily substance. Methiodide, M.P. 198° C. (recrystallized from ethyl acetate).

Analysis.—Calcd. for $C_{26}H_{31}O_4N.CH_3I.¼H_2O$: C, 54.97; H, 6.12; N, 2.47; $H_2O$, 0.79. Found: C, 54.82; H, 6.41; N, 2.38; $H_2O$, 0.75.

Part 2

L-3-methoxy-4-phenoxy-6,6 - ethylenedioxy - N - methylisomorphinan (2.95 g.) was dissolved in anhydrous toluene (30 cc.) and reduced in liquid ammonia (250 cc.) containing sodium at —60 to 65° C. Working up in the similar manner with Example I, 2.07 g. of L-3-methoxy-6,-6 - ethylenedioxy - N - methylisomorphinan was obtained, M.P. 126–127.5° C. (recrystallized from ethanol).

$[\alpha]_D^{29}$ —73.5° (1.018% in chloroform).

Analysis.—Calcd. for $C_{20}H_{27}O_3N$: C, 72.92; H, 8.26; N, 4.25. Found: C, 72.93; H, 8.33; N, 4.06.

Hydrolysis with 5% hydrochloric acid gave L-3-methoxy-6-oxo-N-methylisomorphinan as colorless oily substance.

Picrate, M.P. 229° C. (decomp.) (recrystallized from aqueous ethanol).

Analysis.—Calcd. for $C_{18}H_{23}O_2N.C_6H_3O_7N_3$: C, 56.03; H, 5.09; N, 10.89. Found: C, 56.29; H, 5.26; N, 10.86.

EXAMPLE XXI

Part 1

L-3,6-dimethoxy-4-phenoxy - N - methyl-5,8-didehydromorphinan (prepared in Part 1 of Example I) (3.89 g.) was dissolved in 5% hydrochloric acid (78 cc.), and heated for 30 mins. on a steam bath. The internal temperature was kept at 85–90° C. After cooling, the reaction mixture was neutralized with conc. aqueous ammonia, extracted with benzene and the extracts were dried over anhydrous sodium sulfate. Purifying by chromatography on alumina, the crude product was recrystallized from ethanol to afford 1.88 g. of L-3-methoxy-4-phenoxy-6-oxo-N-methyl-7-dehydroisomorphinan, M.P. 157.5° C.

$[\alpha]_D^{29}$ +90.7° (1.053% in chloroform).

Analysis.—Calcd. for $C_{24}H_{25}O_3N$: C, 76.77; H, 6.71; N, 3.73. Found: C, 76.93; H, 6.87; N, 3.55.

Picrate, M.P. 94° C. (decomp.).

Analysis.—Calcd. for $C_{24}H_{25}O_3N.C_6H_3O_7N_3$: C, 58.72; H, 4.76; N, 9.13. Found: C, 58.58; H, 4.86; N, 8.95.

Part 2

L-3-methoxy-4-phenoxy-6,6-ethylenedioxy - N - methyl-7-dehydroisomorphinan (1.47 g.), which was prepared by ketalisation of L-3-methoxy-4-phenoxy-6-oxo-N-methyl-7-dehydroisomorphinan in the usual method, was dissolved in anhydrous toluene (20 cc.) and anhydrous ether (10 cc.) and reduced in liquid ammonia (120 cc.) containing sodium at —58 to —64° C. Working up in the similar manner with Example I, L-3-methoxy-6,6-ethylenedioxy-N-methyl-7-dehydroisomorphinan (1.04 g.) was obtained as colorless oily substance. Methiodide, M.P. 228° C. (decomp.) (recrystallized from ethyl acetate-methanol).

$[\alpha]_D^{31}$ +13.4° (1.049 EtOH).

Analysis.—Calcd. for $C_{20}H_{25}O_3N.CH_3I$: C, 53.74; H, 6.01; N, 2.98. Found: C, 53.95; H, 6.17; N, 3.15.

Hydrolysis with 5% hydrochloric acid gave L-3-methoxy-6-oxo - N-methyl-7-dehydroisomorphinan, M.P. 120–121° C. (recrystallized from ether).

Analysis.—Calcd. for $C_{18}H_{21}O_2N$: C, 76.29; H, 7.47; N, 4.94. Found: C, 76.15; H, 7.58; N, 4.63.

EXAMPLE XXII

Part 1

A mixture of L-3-methoxy-4-hydroxy-6α-hydroxy-N-methylmorphinan (2 g.), bromobenzene (3.1 g.), potassium carbonate (1.8 g.), copper powder (0.2 g.) and pyridine (20 cc.) was refluxed for 8 hrs. Working up in the similar manner with Example I, 1.72 g. of L-3-methoxy - 4-phenoxy-6α-hydroxy-N-methylmorphinan was obtained as oily substance.

Hydroiodide, M.P. 237–238° C.

Analysis. — Calcd. for $C_{24}H_{29}O_3N.HI.1/2H_2O$: C, 55.82; H, 6.05; N, 2.71. Found: C, 55.62; H, 6.09; N, 3.09.

Part 2

L-3-methoxy-4-phenoxy - 6α - hydroxy - N - methylmorphinan (0.95 g.) was dissolved in anhydrous toluene (10 cc.) and reduced in liquid ammonia (100 cc.) containing sodium. Working up in the similar manner with Example I, 0.57 g. of L-3-methoxy-6α-hydroxy-N-methylmorphinan was obtained, M.P. 134–135° C. (recrystallized from ether).

$[\alpha]_D^{32}$ —31.3° (2.049% in EtOH).

Analysis.—Calcd. for $C_{18}H_{25}O_2N$: C, 75.22; H, 8.77; N, 4.87. Found: C, 75.22; H, 8.73; N, 4.95.

EXAMPLE XXIII

Part 1

A mixture of D-3-ethoxy-4-hydroxy-N-methylmorphinan (2 g.), bromobenzene (3 g.), potassium carbonate (1.8 g.), copper powder (0.3 g.) and pyridine (30 cc.) was refluxed for 10 hrs. Working up in the similar manner with Example I, 1.9 g. of D-3-ethoxy-4-phenoxy-N-methylmorphinan was obtained as colorless oily substance.

Phosphate, M.P. 234–235° C. (recrystallized from water).

$[\alpha]_D^{23}$ +8.4° (1.090% in EtOH).

Analysis. — Calcd. for $C_{25}H_{31}O_2N \cdot H_3PO_4 \cdot H_2O$: C, 60.84; H, 7.35; N, 2.84; P, 6.28. Found: C, 61.20; H, 7.38; N, 2.78; P, 6.44.

Part 2

D-3-ethoxy-4-phenoxy-N-methylmorphinan (0.42 g.) was dissolved in anhydrous toluene (15 cc.) and reduced in liquid ammonia (50 cc.) containing sodium at −40 to −50° C. Working up in the similar manner with Example I, 0.30 g. of D-3-ethoxy-N methylmorphinan was obtained as oily substance, which was identified with an authentic sample obtained from D-3-hydroxy-N-methylmorphinan.

Phosphate, M.P. 227–228° C.

EXAMPLE XXIV

Part 1

A mixture of D-3-methoxy-4-hydroxymorphinan (2 g.), bromobenzene (3.2 g.), potassium carbonate (2 g.) copper powder (0.3 g.) and pyridine (30 cc.) was refluxed for 10 hrs. Working up in the similar manner with Example I, D-3-methoxy-4-phenoxymorphinan (1.7 g.) was obtained as oily substance.

Hydrobromide, M.P. 105° C. (recrystallized from water).

Analysis. — Calcd. for $C_{23}H_{27}O_2N \cdot HBr \cdot 3/2H_2O$: C, 60.39; H, 6.83; N, 3.06; Br, 17.47. Found: C, 60.16; H, 6.89; N, 3.04; Br, 16.90.

Part 2

D-3-methoxy-4-phenoxymorphinan (0.75 g.) was dissolved in anhydrous toluene (14 cc.) and reduced in liquid ammonia (80 cc.) containing sodium. Working up in the similar manner with Example I, 0.53 g. of D-3-methoxymorphinan was obtained as oily substance.

Hydrobromide, M.P. 285° C. (recrystallized from water).

$[\alpha]_D^{28}$ +11.5° (1.203% in EtOH).

Analysis.—Calcd. for $C_{17}H_{23}ON \cdot HBr$: C, 60.35; H, 7.15; N, 4.14. Found: C, 60.53; H, 7.17; N, 4.10.

EXAMPLE XXV

Part 1

A mixture of D-3-methoxy-4-hydroxy-N-cyanomorphinan (2 g.), bromobenzene (3 g.), potassium carbonate (1.8 g.), copper powder (0.3 g.) and pyridine (30 cc.) was refluxed for 10 hrs. Working up in the similar manner with Example I, 1.5 g. of D-3-methoxy-4-phenoxy-N-cyanomorphinan was obtained as oily substance, which showed strong absorption band at 2220 cm.$^{-1}$ attributable to cyano-group.

Part 2

D-3-methoxy-4-phenoxy-N-cyanomorphinan (0.5 g.) was dissolved in anhydrous toluene (15 cc.) and reduced in liquid ammonia (50 cc.) containing sodium at −50° C. Working up in the similar manner with Example I, 0.227 g. of D-3-methoxymorphinan was obtained, which was identified with the product of Example XXIV. The cyano-group of N-atom was eliminated simultaneously in this reaction.

EXAMPLE XXVI

Part 1

A mixture of D-3-methoxy-4-hydroxy-N-ethylmorphinan (1 g.), bromobenzene (1.5 g.), potassium carbonate (1 g.), copper powder (0.1 g.) and pyridine (20 cc.) was refluxed for 10 hrs. Working up in the similar manner with Example I, 0.7 g. of D-3-methoxy-4-phenoxy-N-ethylmorphinan was obtained as oily substance.

Hydrobromide, M.P. 257–260° C. (decomp.) (recrystallized from water).

$[\alpha]_D^{24}$ +32.6° (1.140% in EtOH).

Analysis.—Calcd. for $C_{25}H_{31}O_2N \cdot HBr \cdot H_2O$: C, 63.02; H, 7.19; N, 2.94; Br, 16.77. Found: C, 62.74; H, 7.42; N, 2.94; Br, 16.83.

Part 2

D-3-methoxy-4-phenoxy-N-ethyl-morphinan (1.07 g.) was dissolved in anhydrous toluene (15 cc.) and reduced in liquid ammonia containing sodium. Working up in the similar manner with Example I, 0.76 g. of D-3-methoxy-N-ethylmorphinan was obtained as oily substance.

Hydrobromide, M.P. 225–227° C. (recrystallized from water).

Analysis.—Calcd. for $C_{19}H_{27}ON \cdot HBr \cdot H_2O$: C, 59.37; H, 7.87; N, 3.65; Br, 20.79. Found: C, 59.72; H, 7.87; N, 3.68; Br, 21.12.

$[\alpha]_D^{23}$ +66.8° (1.175% in $H_2O$).

EXAMPLE XXVII

Part 1

A mixture of D-3-methoxy-4-hydroxy-N-phenethylmorphinan (2.3 g.), bromobenzene (3 g.), potassium carbonate (1.8 g.), copper powder (0.3 g.) and pyridine (40 cc.) was refluxed for 15 hrs. Working up in the similar manner with Example I, 1.9 g. of D-3-methoxy-4-phenoxy-N-phenethylmorphinan was obtained, M.P. 140–142° C. (recrystallized from ethanol).

$[\alpha]_D^{20}$ −85.6° (0.548% in EtOH).

Analysis.—Calcd. for $C_{31}H_{35}O_2N$: C, 82.08; H, 7.78; N, 3.09. Found: C, 81.67; H, 8.01; N, 3.17.

Part 2

D-3-methoxy-4-phenoxy-N-phenethylmorphinan (0.727 g.) was dissolved in anhydrous toluene (15 cc.) and reduced in liquid ammonia (60 cc.) containing sodium. Working up in the similar manner with Example I, 0.58 g. of D-3-methoxy-N-phenethylmorphinan was obtained as oily substance.

Oxalate, M.P. 204–205° C. (decomp.) (recrystallized from water).

Analysis.—Calcd. for $C_{25}H_{31}ON \cdot (COOH)_2 \cdot 1/2H_2O$: C, 70.41; H, 7.44; N, 3.04. Found: C, 70.70; H, 7.33; N, 3.22.

EXAMPLE XXVIII

Part 1

A mixture of D-3-methoxy-4-hydroxy-N-phenacetylmorphinan (1.3 g.), bromobenzene (1.5 g.), potassium carbonate (0.9 g), copper powder (0.2 g.) and pyridine (20 cc.) was refluxed for 10 hrs. Working up in the similar manner with Example I, 0.9 g. of D-3-methoxy-4-phenoxy-N-phenacetylmorphinan was obtained as oily substance, which showed a strong absorption band at 1630 cm.$^{-1}$ attributable to >CO-group.

Part 2

D-3-methoxy-4-phenoxy-N-phenacetylmorphinan (0.439 g.) was dissolved in anhydrous toluene (15 cc.) and reduced in liquid ammonia (50 cc.) containing sodium. Working up in the similar manner with Example I, 0.317 g. of D-3-methoxy-N-phenacetylmorphinan was obtained as oily substance, which was identified by reduction to D-3-methoxy-N-phenethylmorphinan obtained in Example XXVII.

Thus describing our invention, we claim:

1. A process for the elimination of the 4-hydroxyl group from a morphinan selected from the group consisting of C-ring saturated and C-ring unsaturated D-morphinans, L-morphinans, D-isomorphinans and L-isomorphinans which have a lower alkoxy group at the 3-position and a hydroxyl group at the 4-position and the C-ring of which is substituted by a member selected from the group consisting of hydrogen and lower alkyl, lower alkoxy, hydroxyl, oxo and lower alkylenedioxy groups, and the N-atom of which bears a member selected from the group consisting of hydrogen and lower alkyl, phenyl (lower)alkyl, phenyl-(lower)alkylcarbonyl and cyano groups, which comprises the steps of reacting said morphinan with aryl halide selected from the group consisting of phenyl halide, naphthyl halide, pyridyl halide and quinolyl halide at 100–200° C. in the presence of copper powder to form the corresponding 4-aryl ether, and reducing the latter with a member selected from the group consisting of alkali metal and alkaline earth metal in a solvent selected from the group consisting of liquid ammonia and liquid ammonia containing a member selected from the group consisting of ether, dioxane, tetrahydrofuran and toluene at −33 to −70° C. to eliminate selectively the 4-aryloxy group.

2. A process according to claim 1, wherein the 4-aryl ether is heated with amalgamated zinc in concentrated hydrochloric acid at approximately 100° C. to eliminate C-ring substituents selected from the group consisting of hydroxyl, oxo, lower alkoxy and lower alkylenedioxy groups prior to the 4-aryloxy group elimination.

3. 3,6-dimethoxy-N-methyl-5,8-didehydromorphinan.
4. 3-methoxy-6-oxo-N-methylmorphinan.
5. 3,7-dimethoxy-6-oxo-N-methyl-7-dehydromorphinan.
6. 3,7-dimethoxy-6-oxo-N-methylmorphinan.
7. 3-methoxy-6-oxo-14-hydroxy-N-methylmorphinan.
8. 3-methoxy-6-oxo-N-methylisomorphinan.
9. 3-methoxy-6-oxo-N-methyl-7-dehydroisomorphinan.
10. 3-methoxy-6-hydroxy-N-methylmorphinan.
11. A compound of the formula

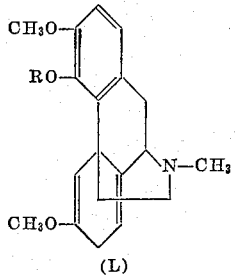

(L)

wherein R is a member selected from the group consisting of

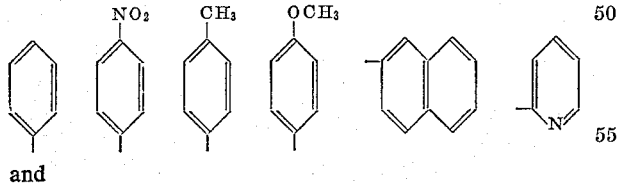

and

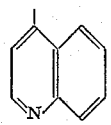

12. The compound of the formula

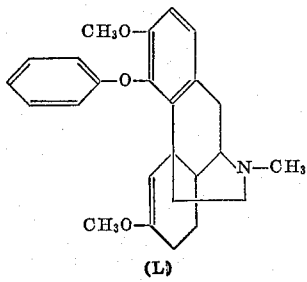

(L)

13. The compound of the formula

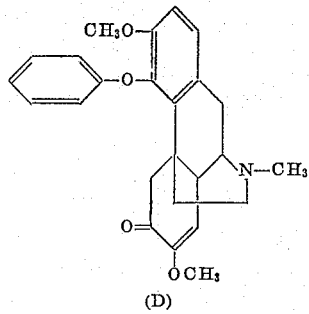

(D)

14. The compound of the formula

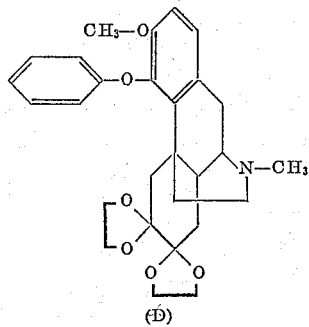

(D)

15. The compound of the formula

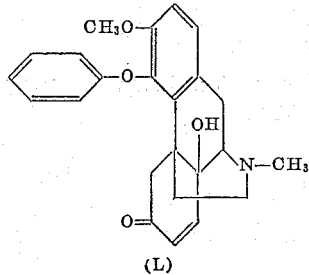

(L)

16. The compound of the formula

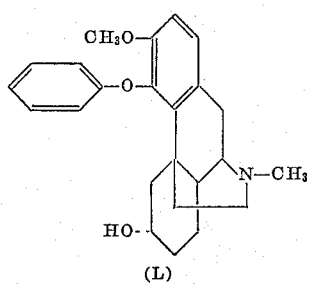

(L)

17. A compound of the formula

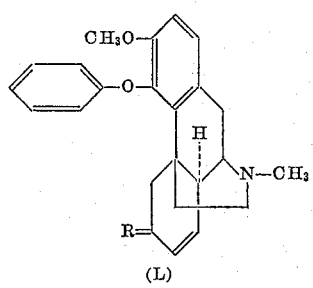

(L)

wherein R is a member selected from the group consisting of =O and

18. A compound of the formula

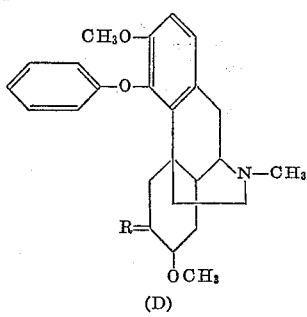

wherein R is a member selected from the group consisting of =O and

19. A member selected from the group consisting of the D-, L- and L-iso-compounds corresponding to the formula

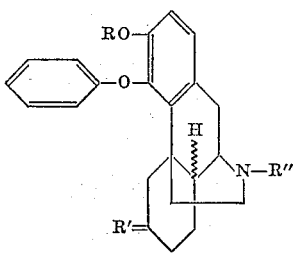

wherein:
R is a member selected from the group consisting of $CH_3$ and $C_2H_5$, R' is a member selected from the group consisting of =O

and $H_2$, and
R'' is a member selected from the group consisting of $CH_3$, $C_2H_5$, H, CN,

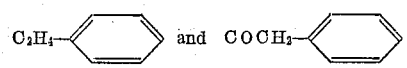

References Cited in the file of this patent

UNITED STATES PATENTS 2,885,401    Grussner et al. _____ May 5, 1959

FOREIGN PATENTS 713,146    Great Britain _____ Aug. 4, 1954
761,974    Great Britain _____ Nov. 21, 1956

OTHER REFERENCES

Chemical Abstracts, volume 49, page 8501gh (1955), citing Arzneimittel Forsch, volume 5, pages 62–6 (1955).

Grussner et al.: Helvetica Chimica Acta, volume 39, pages 436–440 (1956).

Grussner et al.: Helvetica Chimica Acta, volume 40, pages 1236–1237 (1957).

Gates et al.: J. American Chem. Soc., volume 80, page 1191 (1958).

Corradi et al.: Helvetica Chimica Acta, volume 42, pages 212–217 (1959).